United States Patent
Koshiishi et al.

(10) Patent No.: US 11,314,237 B2
(45) Date of Patent: Apr. 26, 2022

(54) MANAGING APPARATUS AND MANAGING SYSTEM

(71) Applicant: FANUC CORPORATION, Yamanashi (JP)

(72) Inventors: Hikaru Koshiishi, Yamanashi (JP); Yasuyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 139 days.

(21) Appl. No.: 16/801,203

(22) Filed: Feb. 26, 2020

(65) Prior Publication Data

US 2020/0285224 A1 Sep. 10, 2020

(30) Foreign Application Priority Data

Mar. 4, 2019 (JP) .............................. JP2019-038943

(51) Int. Cl.
*G05B 19/00* (2006.01)
*G05B 19/418* (2006.01)
*G05B 13/02* (2006.01)

(52) U.S. Cl.
CPC ... *G05B 19/41875* (2013.01); *G05B 13/0265* (2013.01); *G05B 2219/37428* (2013.01)

(58) Field of Classification Search
CPC .......... G05B 19/41875; G05B 13/0265; G05B 2219/37428; G05B 2219/32255;
(Continued)

(56) References Cited

U.S. PATENT DOCUMENTS 6,041,271 A * 3/2000 Lindstrom ................ G01N 3/58
700/175
2007/0105697 A1* 5/2007 Iefuji .................. B23Q 11/0007
483/1
(Continued)

FOREIGN PATENT DOCUMENTS

CN 106404537 A 2/2017
JP 2002373191 A 12/2002
(Continued)

OTHER PUBLICATIONS

Laspas, Theodoros. "Modeling and measurement of geometric error of machine tools: Methodology and implementation." (2014). (Year: 2014).*

(Continued)

*Primary Examiner* — Michael D Masinick
(74) *Attorney, Agent, or Firm* — Hauptman Ham, LLP

(57) ABSTRACT

A managing apparatus includes a data collecting unit that collects at least quality information on a workpiece having been machined by a first machine tool and operational information on other machine, an analyzing unit that performs an analysis for determining correlation between the quality information on a workpiece having been machined by the first machine tool and a change in the operational information on the other machine, an operation plan making unit that makes an operation plan, based on the correlation determined by the analyzing unit, for imposing a restriction on an operation of the other machine to reduce a change in environmental temperature of the first machine tool during high-precision machining performed by the first machine tool, and an operation instruction providing unit that provides an operation instruction to the other machine based on the operation plan made by the operation plan making unit.

9 Claims, 10 Drawing Sheets

(58) Field of Classification Search
CPC .......... G05B 19/41865; G05B 19/4183; G05B 19/418; G05B 19/4093; G05B 23/02; Y02P 90/02; F24F 11/80
See application file for complete search history.

(56) References Cited

U.S. PATENT DOCUMENTS

| | | |
|---|---|---|
| 2013/0060373 A1 | 3/2013 | Otsuki |
| 2017/0023417 A1* | 1/2017 | Koyama ................ G01K 7/427 |
| 2018/0275639 A1 | 9/2018 | Shinoda et al. |
| 2019/0041808 A1 | 2/2019 | Hada et al. |
| 2020/0257261 A1* | 8/2020 | Koshiishi ................ F24F 11/49 |
| 2020/0292394 A1* | 9/2020 | Karaki ................... G01K 1/022 |

FOREIGN PATENT DOCUMENTS

| | | |
|---|---|---|
| JP | 2013058035 A | 3/2013 |
| JP | 2018202560 A | 12/2018 |
| JP | 201932649 A | 2/2019 |

OTHER PUBLICATIONS

Krulewich, Debra A. "Temperature integration model and measurement point selection for thermally induced machine tool errors." Mechatronics 8.4 (1998): 395-412. (Year: 1998).*

\* cited by examiner

FIG.4

| IDENTIFICATION INFORMATION | DEVICE NAME | TYPE | INSTALLATION POSITION | CONNECTION INFORMATION | ⋮ |
|---|---|---|---|---|---|
| 1 | δ-DiBADV1 | MACHINE TOOL | FACTORY A-2F-201 | 192.168.1.101 | ⋮ |
| 2 | δ-DiBADV2 | MACHINE TOOL | FACTORY A-2F-201 | 192.168.1.102 | ⋮ |
| 3 | δ-DiBADV3 | MACHINE TOOL | FACTORY A-2F-201 | 192.168.1.103 | ⋮ |
| 4 | CR-7iA1 | ROBOT | FACTORY A-2F-201 | 192.168.1.104 | ⋮ |
| 5 | HV-235 | MIST COLLECTOR | FACTORY A-2F-201 | HOST DEVICE=[1] | ⋮ |
| 6 | ZEAB-112 | AIR CONDITIONER | FACTORY A-2F-201 | 192.168.1.201 | ⋮ |
| 7 | ZEAB-114 | AIR CONDITIONER | FACTORY A-1F-101 | 192.168.0.201 | ⋮ |
| ⋮ | ⋮ | ⋮ | ⋮ | ⋮ | ⋮ |

FIG.5

| IDENTIFICATION INFORMATION OF MACHINE TOOL | IDENTIFICATION INFORMATION OF ANOTHER EDGE COMPUTER | CORRELATIVITY |
|---|---|---|
| 1 | 2 | HIGH |
| 1 | 3 | LOW |
| 1 | 4 | MIDDLE |
| 1 | 5 | HIGH |
| 1 | 6 | LOW |
| 1 | 7 | MIDDLE |
| 2 | 1 | HIGH |
| 2 | 3 | MIDDLE |
| 2 | 4 | MIDDLE |
| ... | ... | ... |

MANAGING APPARATUS AND MANAGING SYSTEM

RELATED APPLICATIONS

The present application claims priority to Japanese Patent Application Number 2019-038943 filed Mar. 4, 2019, the disclosure of which is hereby incorporated by reference herein in its entirety.

BACKGROUND OF THE INVENTION

1. Field of the Invention

The present disclosure relates to a managing apparatus and a managing system, and particularly to a managing apparatus and a managing system that manage the operations of a plurality of industrial machines installed in a manufacturing site such as a factory.

2. Description of the Related Art

Nowadays, many industrial machines such as machine tools and robots are installed in a manufacturing site such as a factory, and these industrial machines are operated under the control of a managing apparatus or a managing system for mass production (See JP 2002-373191 A, for example). Under these conditions, machine tools such as machining centers often machine IT parts or exteriors of ornaments with high precision (See JP 2013-058035 A, for example).

When an industrial machine is operated for manufacturing or transferring products, heat is generated in the industrial machine. The heat thus generated in the industrial machine may propagate through air, a wall, a floor, and so on, and affect the operation of another industrial machine. For example, the heat generated while roughing performed by a machining center and the heat generated by the operation of a peripheral machine such as a transferring machine is sometimes transferred to another machining center through an environment such as air. If an environmental temperature of the machining center performing high-precision finishing changes due to the influence of the heat generated in the peripheral machine, the surface precision of the workpiece may significantly be deteriorated.

To solve such a problem in a manufacturing site, a solution can be conceived in which the setting values for rapid traverse, cutting feed and acceleration/deceleration for tool changing are lowered for all the machines installed on a floor for example, and, in light of the layout of an air conditioner and a peripheral machine, a cooling device such as the air conditioner is operated at optimum settings in a time period during which a failure occurs, which prevents the heat from affecting the finishing. This method, however, causes another problem of the decrease in the overall work efficiency in the manufacturing site. Thus, this method cannot be a practical solution.

Another solution can be conceived in which the layout of the industrial machines in a manufacturing site is changed. For example, a machining center for finishing and another machining center can be installed on different floors. However, changing the positions of many heavy industrial machines is very troublesome. Moreover, specializing a machine in one specific machining decreases the overall machining efficiency in the manufacturing site (because the machining center specialized in finishing cannot be used for other purposes). Thus, a more flexible solution is required.

SUMMARY OF THE INVENTION

One aspect of the present disclosure is a managing apparatus for factory equipment, the managing apparatus being used in a manufacturing site in which a first machine tool for high-precision machining and at least one other machine are in operation, and used for managing an operation of the other machine, including: a data collecting unit that collects at least quality information on a workpiece having been machined by the first machine tool and operational information on the other machine; an analyzing unit that performs an analysis for determining correlation between the quality information on a workpiece having been machined by the first machine tool and a change in the operational information on the other machine; an operation plan making unit that makes an operation plan, based on the correlation determined by the analyzing unit, for imposing a restriction on an operation of the other machine to reduce a change in an environmental temperature of the first machine tool during high-precision machining performed by the first machine tool; and an operation instruction providing unit that provides an operation instruction to the other machine based on the operation plan made by the operation plan making unit.

Another aspect of the present disclosure is a managing system having a plurality of managing apparatuses for factory equipment, the apparatuses being connected with each other via a network, in which an analytical result provided by the analyzing unit can be shared with each other among the plurality of managing apparatuses.

The aspects of the present disclosure enable the establishment of a machine environment that facilitates high-precision machining without significantly decreasing the machining efficiency in a manufacturing site.

BRIEF DESCRIPTION OF THE DRAWINGS

The objects and characteristics of the present disclosure will be clarified by reading the following detailed description of the preferred embodiments with reference to the accompanying drawings.

FIG. 4 is a table showing exemplary management information;

FIG. 5 is a table showing exemplary correlation information;

DETAILED DESCRIPTION OF THE PREFERRED EMBODIMENTS

Embodiments of the present disclosure will now be described with reference to the drawings.

Figure 1:
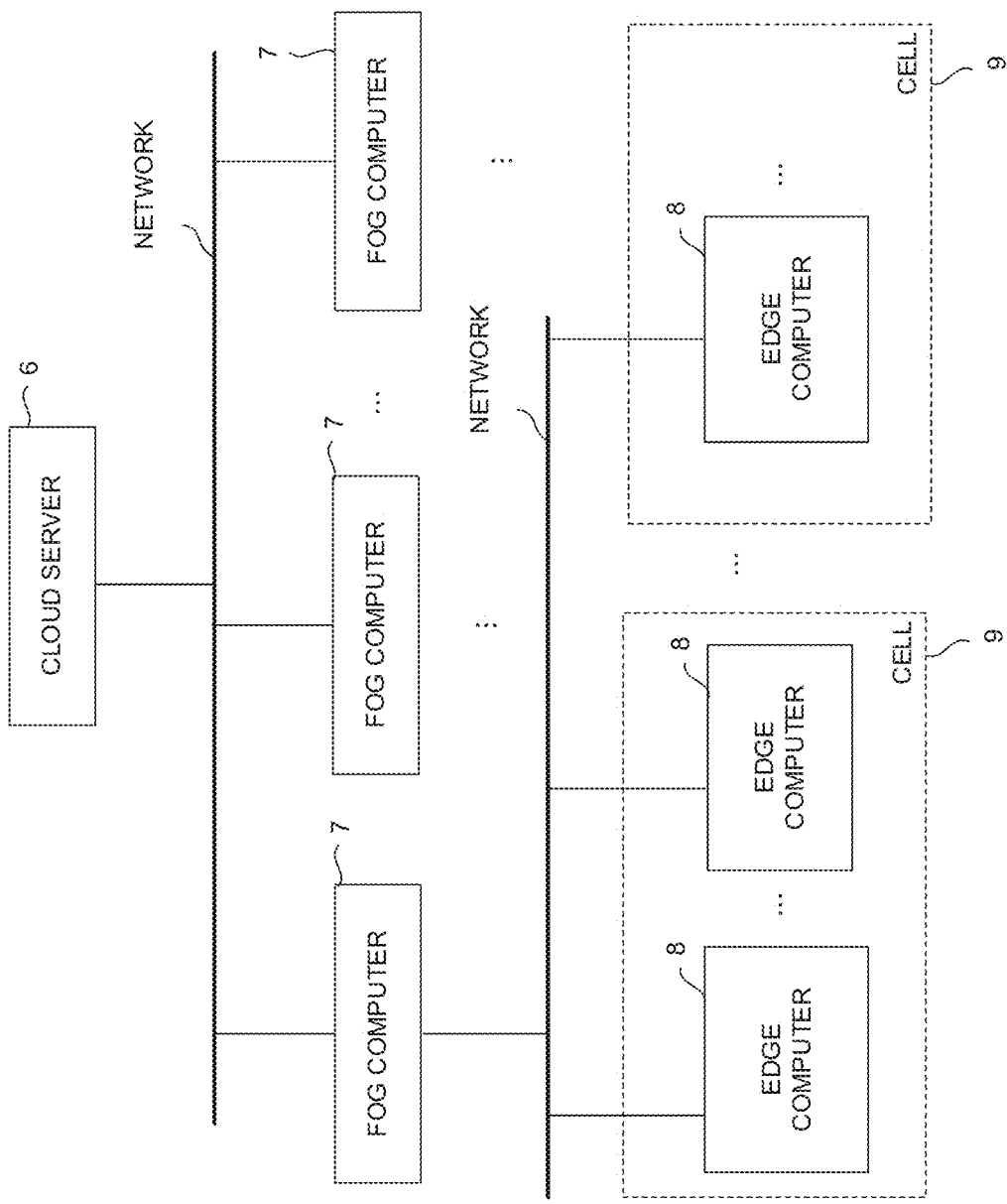
FIG. 1 is a schematic diagram showing the operating environment of a managing apparatus according to an embodiment.

FIG. 1 is a schematic diagram showing the operating environment of a managing apparatus according to an embodiment of the present disclosure. As shown in FIG. 1, the managing apparatus of the embodiment of the present disclosure operates in an environment in which a plurality of devices including a cloud server 6, a fog computer 7, an edge computer 8 are connected to a wired/wireless network individually. The system shown in FIG. 1 as an example has a logical three-layered hierarchical structure. The structure has a first layer including the cloud server 6, a second layer including the fog computer 7, and a third layer including the edge computer 8 (such as a robot controller for controlling a robot, a controller for controlling a machine tool, and an air conditioner and ventilator installed in a manufacturing site, in a cell 9). In this system, the managing apparatus of the embodiment of the present disclosure can be implemented on any of the cloud server 6, the fog computer 7, and the edge computer 8. The managing apparatus can share data with each device via the network, and collect and analyze, in the fog computer 7 or the cloud server 6, a large amount of various kinds of data obtained by the edge computer 8. Moreover, the managing apparatus can control the operation of each edge computer 8 based on the analytical result. In the system shown in FIG. 1 as an example, a plurality of cells 9 are provided for each local factory (for example, a factory has one cell 9 on each floor). Also, in this system, the cells 9 are managed in a predetermined unit (for example, the cells 9 in one factory are considered as one unit, or the cells 9 in a plurality of factories belonging to one manufacture are considered as one unit) by the fog computer 7 in the upper layer. The data collected and analyzed by the fog computer 7 can then be collected and analyzed by the cloud server 6 in the further upper layer, for example. The information obtained through the data collection and analysis performed by the cloud server 6 may be used for the control over each edge computer 8, for example.

Figure 2:
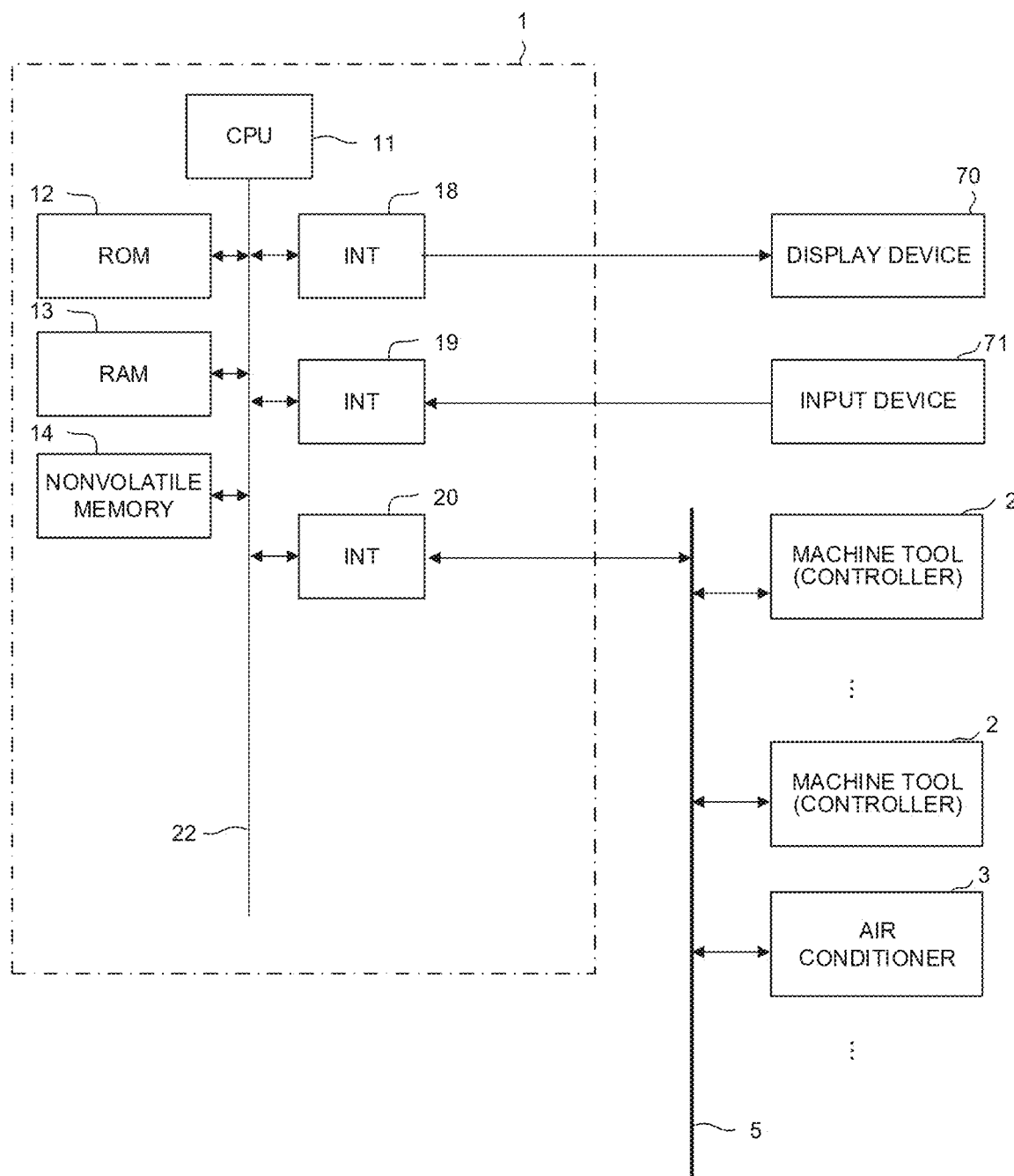
FIG. 2 is a schematic diagram showing the hardware structure of a managing apparatus according to an embodiment.

FIG. 2 is a schematic diagram showing the hardware structure of a managing apparatus 1 according to an embodiment of the present disclosure. The managing apparatus 1 of the present embodiment can be implemented as the edge computer 8, the fog computer 7, or the cloud server 6 shown in FIG. 1 as an example. In the present embodiment, the managing apparatus 1 is implemented as the fog computer 7 that manages the operations of the plurality of edge computers 8, for example.

The managing apparatus 1 of the present embodiment includes a central processing unit (CPU) 11 that controls the whole managing apparatus 1. The CPU 11 is connected with a read only memory (ROM) 12 via a bus 22. The CPU 11 reads a system program stored in the ROM 12 and controls the whole managing apparatus 1 according to the system program. A random access memory (RAM) 13 stores data such as temporary calculation data, display data to be displayed on a display device 70, and various kinds of data input by an operator with an input device 71.

A nonvolatile memory 14 includes a memory and a solid state drive (SSD), which are backed up by a battery (not shown). The nonvolatile memory 14 is configured to be a memory that retains a memory status even when a power source of the managing apparatus 1 is turned off. The nonvolatile memory 14 has a setting area that stores setting information on the operation of the managing apparatus 1. The nonvolatile memory 14 stores data input through the input device 71 and various kinds of data obtained from an edge computer that is under the control of the managing apparatus 1, such as a machine tool 2 and an air conditioner 3. The data stored in the nonvolatile memory 14 includes operational information on the machine tool 2, quality information on a workpiece having been machined by the machine tool 2, and operational information on the air conditioner 3. The nonvolatile memory 14 also stores data read via an external storage (not shown) or a network, for example. The program and various kinds of data stored in the nonvolatile memory 14 may be loaded in the RAM 13 to be executed/used. The ROM 12 stores a prewritten system program including a known analysis program for analyzing various kinds of data.

The managing apparatus 1 is connected to the wired/wireless network 5 via an interface 20. The network 5 has connections with devices such as at least one machine tool 2, the air conditioner 3 installed in a manufacturing site, or the managing apparatus (not shown) for managing the air conditioner 3. These devices connected to the network 5 exchange data with the managing apparatus 1.

The display device 70 displays various kinds of data such as data read into the memory and data obtained through the execution of a program and the like, which is output via an interface 18. The input device 71 includes a keyboard and a pointing device. An operator can use the input device 71 to input instructions, data, and the like, which are sent to the CPU 11 via the interface 19.

Figure 3:
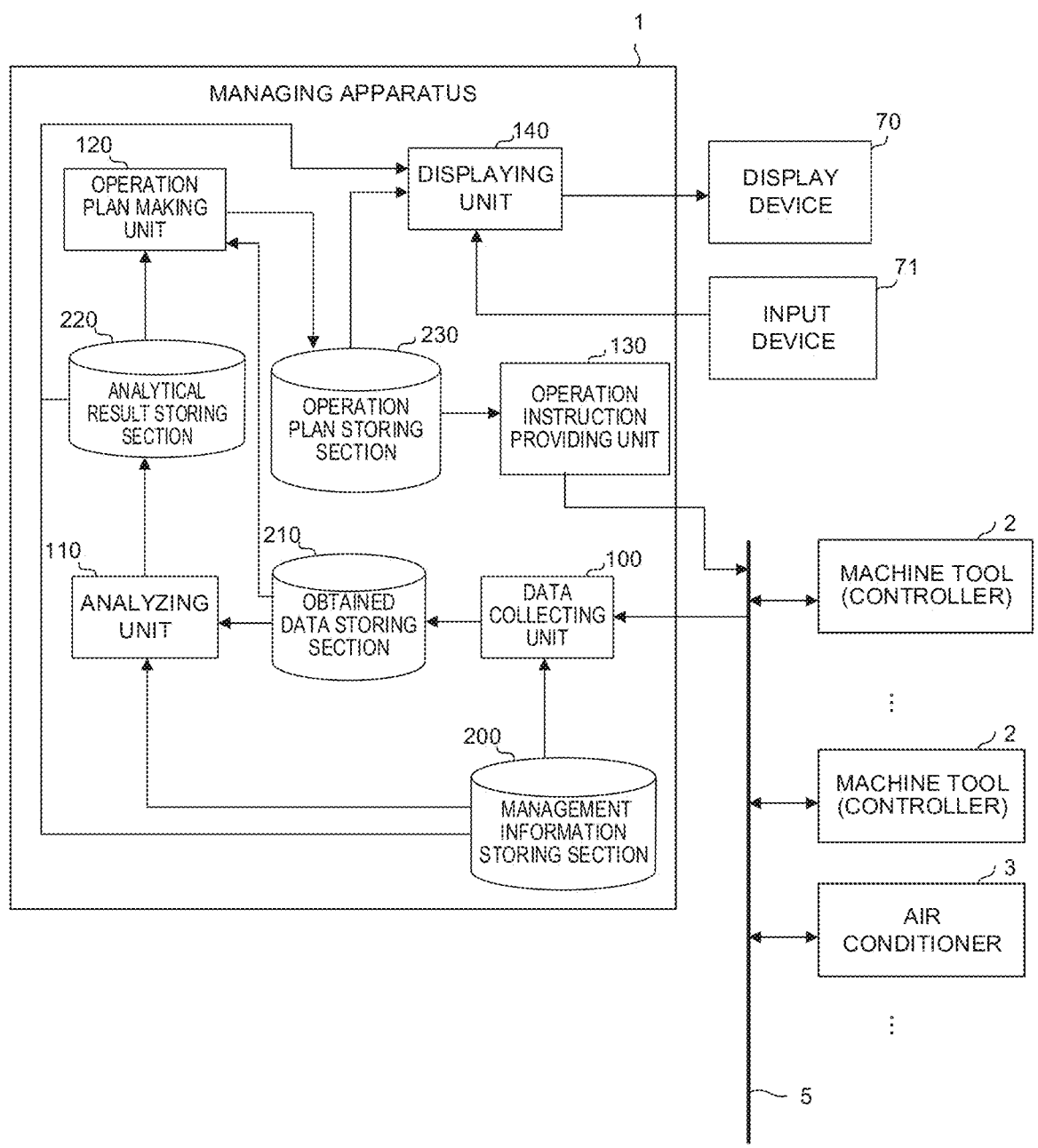
FIG. 3 is a schematic functional block diagram of a managing apparatus according to a first embodiment.

FIG. 3 is a schematic functional block diagram of the managing apparatus 1 according to a first embodiment. Each function of the functional block shown in FIG. 3 is provided by executing the system program by the CPU 11 of the managing apparatus 1 shown in FIG. 2 to control the operation of each part of the managing apparatus 1.

The managing apparatus 1 of the present embodiment includes a data collecting unit 100, an analyzing unit 110, an operation plan making unit 120, an operation instruction providing unit 130, and a displaying unit 140. The data collecting unit 100 collects data to be analyzed from each edge computer that is under the control of the managing apparatus 1 (such as the machine tool 2, a peripheral device of the machine tool 2, and the air conditioner 3). The analyzing unit 110 analyzes the data collected by the data collecting unit 100. The operation plan making unit 120 makes an operation plan for each edge computer based on the analytical result provided by the analyzing unit 110. The operation instruction providing unit 130 provides an operation instruction to each edge computer based on the operation plan for the edge computer made by the operation plan making unit 120. The displaying unit 140 displays the analytical result provided by the analyzing unit 110 and the operation plan made by the operation plan making unit 120, on the display device 70. The nonvolatile memory 14 of the managing apparatus 1 includes a management information storing section 200, an obtained data storing section 210, an analytical result storing section 220, and an operation plan storing section 230. The management information storing section 200 stores the management information on each edge computer that is under the control of the managing apparatus 1. The obtained data storing section 210 stores the data collected by the data collecting unit 100. The analytical result storing section 220 stores the analytical result provided by the analyzing unit 110. The operation plan storing section 230 stores the operation plan made by the operation plan making unit 120.

The CPU 11 of the managing apparatus 1 shown in FIG. 2 executes the system program read out from the ROM 12, and primarily the CPU 11 executes arithmetic processing with the RAM 13 and the nonvolatile memory 14 and data input/output processing with the machine tool 2, the air conditioner 3, and so on via the interface 20, so that the data collecting unit 100 is implemented. The data collecting unit 100 is a functional unit that collects information from each edge computer that is under the control of the managing apparatus 1, such as the machine tool 2 and the air conditioner 3, based on the management information stored in the management information storing section 200; and causes the obtained data storing section 210 to store the information. The information on each edge computer collected by the data collecting unit 100 includes the operational information on the edge computer and the information on an environment detected by the edge computer. For example, the data collecting unit 100 obtains, from each machine tool 2 as an edge computer, the operational information on the machine tool 2 (such as the speed, acceleration, and moving frequency of an axis of the machine tool 2) and the information on the type of machining performed by the machine tool 2 (such as roughing and finishing). The data collecting unit 100 also obtains, from each machine tool 2, the quality information on a workpiece having been machined by the machine tool 2 (such as the dimension accuracy and surface quality of the workpiece) and the operational information on a peripheral device providing support for machining performed by the machine tool 2, for example. The data collecting unit 100 may obtain a machining program to be executed by the machine tool 2, the values detected at several sites of the machine tool 2, the operational information on the machine tool 2 that is under the control of the production planning device or the like, and the data measured or detected by a sensor or the like attached to the machine tool 2, for example. The data collecting unit 100 may also obtain the operational information, machining information, quality information on the machine tool 2 based on the information input into the machine tool 2 by an operator, for example. The data collecting unit 100 may also obtain the past operational and environmental information on each edge computer as well as the present operational and environmental information on each edge computer. The data collecting unit 100 may also obtain the information on the future (planned) operation of each edge computer. The data collecting unit 100 may obtain the operational information and information on set temperature of the air conditioner 3 as an edge computer and the environmental information on the air conditioner 3 (such as an environmental temperature) from the air conditioner 3 or the managing apparatus (not shown) for managing the air conditioner 3, for example.

FIG. 4 is a table showing the management information on each edge computer stored in the management information storing section 200. The management information stored in the management information storing section 200 includes the identification information for identifying each edge computer that is under the control of the managing apparatus 1 and the information on the edge computer. The information on each edge computer included in the management information includes information on the name of the edge computer, the type of the edge computer, the installation position of the edge computer, and the connection status of the edge computer, for example. The information on the installation position of each edge computer included in the management information may include the factory name, the floor name, the room name, and the coordinate position in the room in which the edge computer is installed, for example. The installation position of each edge computer may be defined by the latitude, longitude, and altitude, for example. The information on the connection status of each edge computer included in the management information may be shown using a network address that is used for connecting the edge computer to the managing apparatus 1 via the network 5. The information on the connection status of each edge computer may be shown using the identification information on another edge computer to which the edge computer is attached (In the example of FIG. 4, the mist collector with the identification number 5 is attached to the host device, the machine tool 2 with the identification number 1, so the information on the mist collector with the identification number 5 can be obtained through the host device, the machine tool 2 with the identification number 1). Each edge computer may be associated with the information on another device that provides information on the edge computer (not shown in FIG. 4). For example, when the edge computer is a machine tool, the machine tool may be associated with the information on another device such as the production planning device that manages the machine tool and the CAD/CAM device that provides machining information to the machine tool. The management information stored in the management information storing section 200 should include at least the information necessary for collecting the data on each edge computer and the information necessary for determining the positional relationship(s) between the edge computers.

The CPU 11 of the managing apparatus 1 shown in FIG. 2 executes the system program read out from the ROM 12, and primarily the CPU 11 executes arithmetic processing with the RAM 13 and the nonvolatile memory 14, so that the analyzing unit 110 is implemented. The analyzing unit 110 is a functional unit that analyzes the data collected by the data collecting unit 100 (the data stored in the obtained data storing section 210) to determine the correlation between the result of machining performed by each machine tool 2 and the operational information on another edge computer (such as another machine tool 2 and the air conditioner 3). The analyzing unit 110 causes the analytical result storing section 220 to store the analytical result. The analyzing unit 110 analyzes the operational information on each edge computer and the quality information on a workpiece having been machined by each machine tool 2 stored in the obtained data storing section 210 to determine the correlation between the two sets of information, for example.

The analyzing unit 110 refers to the installation position of each edge computer stored in the management information storing section 200 and retrieves the information on a pair of an edge computer and another edge computer to be analyzed. The pair to be retrieved for analysis has a certain positional relationship between the edge computer and the other edge computer. The certain positional relationship means the positional relationship between the other edge computer and an edge computer that will probably be affected by the heat generated by the operation of the other edge computer. For example, the pair of the machine tool 2 to be retrieved for analysis and another edge computer may be a pair of the machine tool 2 and another edge computer installed in the same room, a pair of the machine tool 2 and another edge computer installed on the same floor, and a pair of the machine tool 2 installed on an upper floor and the air conditioner 3 as another edge computer installed on a lower floor, for example.

The analyzing unit 110 performs an analysis of the retrieved pair for determining the correlation between the product quality of a workpiece having been machined by the machine tool 2 and a change in the operational information on the other edge computer during the finishing of the workpiece. The analyzing unit 110 determines the correlation between the product quality of a workpiece having been machined by the machine tool 2 and a change in the operational information on the other edge computer during the finishing of the workpiece by known analytical methods such as regression analysis and correlation analysis. The analyzing unit 110 may perform a regression analysis or a correlation analysis with a response variable of a quality value calculated based on the product quality of a workpiece having been machined by the machine tool 2, and an explanatory variable of an operational change value calculated based on the operational information on the other edge computer during the finishing of the workpiece according to a predetermined criterion, for example. The operational change value here means a value indicating the magnitude of change in the heat value or thermal energy and so on at the other edge computer, for example. This enables the analysis for determining the correlation between the product quality of a workpiece having been machined by the machine tool 2 and a change in the operational information on the other edge computer during the finishing of the workpiece. The quality value indicating the quality of a workpiece having been machined by the machine tool 2 is calculated based on the quality information on the workpiece having been machined by the machine tool 2, which is stored in the obtained data storing section 210, according to a predetermined criterion. This quality value may be a value calculated using a predetermined function that has an argument of a value indicating the precision or surface quality of the machined workpiece, which has been obtained by measuring the machined workpiece in advance (the function produces a higher value with a higher precision or surface quality value), for example. The operational change value may be a value calculated using a predetermined function that has an argument of a variation during the finishing of a parameter value related to the operation that causes the heat generation at the other edge computer (such as the speed, acceleration, and moving frequency of an axis of the machine tool 2 or a robot, or temperature setting of the air conditioner 3) (the function producing a higher value with a higher parameter value that significantly affects the heat generation at the other edge computer).

The analyzing unit 110 should preferably perform an analysis for determining the correlation between the machine tool 2 and another edge computer using the data obtained under the condition that no edge computers are operating except the machine tool 2 and the other edge computer (alternatively, the condition of continuing predetermined operation), among the data collected by the data collecting unit 100. To generate such data, an operator may have a process for data collection while operating only the machine tool 2 and another edge computer different from the machine tool 2 after installing the edge computers in a manufacturing site. Alternatively, the analyzing unit 110 may perform an analysis for determining the correlation between the machine tool 2 and two or more other edge computers based on the data obtained under the environment that the machine tool 2 and the two or more other edge computers are operating. The analyzing unit 110 may perform an analysis while taking the difference between the various data, assuming that the influence (heat generation) of two or more other edge computers on the finishing by the machine tool 2 is superimposed (added).

FIG. 5 is a table showing example correlation information determined based on the analytical result provided by the analyzing unit 110 and stored in the analytical result storing section 220. The correlation information includes the identification information on the machine tool 2, the identification information on another edge computer, and the correlativity between the machine tool 2 and the other edge computer. The correlativity here means the information on the correlation between the product quality of a workpiece having been machined by the machine tool 2 and a change in the operational information of another edge computer during the finishing of the workpiece, for example. In the example of FIG. 5, the correlativity between the product quality of a workpiece having been machined by the machine tool 2 and a change in the operational information of another edge computer during the finishing of the workpiece is shown in three indications: high, middle, and low. The correlativity may be shown by using different indications such as a correlation coefficient value, for example. When the analyzing unit 110 generates a correlation function, a correlation model, or the like indicating the characteristics of the correlativity between the product quality of a workpiece having been machined by the machine tool 2 and the change in the operational information of the other edge computer during the finishing of the workpiece, the generated correlation function or correlation model may be stored in the analytical result storing section 220.

The CPU 11 of the managing apparatus 1 shown in FIG. 2 executes the system program read out from the ROM 12, and primarily the CPU 11 executes arithmetic processing with the RAM 13 and the nonvolatile memory 14, so that the operation plan making unit 120 is implemented. The operation plan making unit 120 is a functional unit that makes an operation plan based on the data collected by the data collecting unit 100 (the data stored in the obtained data storing section 210) and the correlation information generated by the analyzing unit 110 (the correlation information stored in the analytical result storing section 220). The operation plan is designed to impose or lift a predetermined restriction on or from the operation of an edge computer that is under the control of the managing apparatus 1. The operation plan making unit 120 causes the operation plan storing section 230 to store the operation plan. When the operation plan making unit 120 expects that the machine tool 2 will perform finishing, with reference to the data collected by the data collecting unit 100, for example; the operation plan making unit 120 identifies the edge computer having high correlativity with the machine tool 2 based on the analytical result provided by the analyzing unit 110. The operation plan making unit 120 then determines the operational status of the edge computer having high correlativity with the machine tool 2 that will perform finishing. During the finishing by the machine tool 2, if a change in the operational status that will affect the finishing occurs in the edge computer, the operation plan storing section 230 is caused to store the operation plan that will restrict the operation of the edge computer, for example, a restriction of reducing the moving speed or acceleration of an axis, and a restriction of reducing a change in the moving speed or acceleration of the axis. The operation plan making unit 120 also makes the operation plan that will lift the restriction from the operation of the edge computer once the finishing is completed by the machine tool 2, and causes the operation plan storing section 230 to store the operation plan.

The operation plan making unit 120 may make the operation plan that will impose a restriction on the operation of the edge computer according to a predetermined operation restriction rule. The operation restriction rule to be used by the operation plan making unit 120 is determined by the relationship of the degree of the correlativity between the product quality of a workpiece having been machined by the machine tool 2 and a change in the operational information on the machine tool 2 as another edge computer during the finishing of the workpiece, and the predetermined restriction on a controllable operation of the other edge computer. The operation plan making unit 120 may use the following operation restriction rules, for example. On the condition that there is high correlativity between the product quality of a workpiece having been machined by a first machine tool 2 and a change in the operational information of a second machine tool 2 as another edge computer during the finishing of the workpiece, a restriction is imposed on the movement of an axis of the second machine tool 2 so that the moving speed of the axis has a value of a predetermined maximum speed of Flim1 or less and the acceleration of the axis has a value of a predetermined maximum acceleration of Falim1 or less. Further, a rule that a change in the moving speed of the axis of the second machine tool 2 is reduced to fall within the range of ±Fvlim during the finishing with the first machine tool 2 is possible. Further, as another example of the operation restriction rule used in the operation plan making unit 120, on the condition that there is middle or more correlativity between the product quality of a workpiece having been machined by the first machine tool 2 and the operational information on the air conditioner 3 as another edge computer during the finishing of the workpiece, a rule may be designed to impose a restriction so as not to change the temperature setting of the air conditioner 3 during the finishing of the workpiece. The operation restriction rule may be designed to impose a restriction only on a specific operation of another edge computer. For example, when the other edge computer is a machine tool, it is possible to design an operation restriction rule to impose a restriction only on an axis having a large heat value.

The predetermined operation restriction rule used in the operation plan making unit 120 may be a rule to impose a combined operation restriction on further a plurality of other edge computers. The operation plan making unit 120 can use the operation restriction rule to impose a combined operation restriction as described below. In a case where there is a high correlativity between the product quality of a workpiece having been machined by the first machine tool 2 and a change in the operational information on the plurality of other edge computers, the operation restriction rule may be a rule to impose a restriction so that, at a time when a heat value of a first edge computer of the plurality of other edge computers increases, a heat value of a second edge computer of the plurality of other edge computers drops. Such a rule is made by applying a restriction that, in order to prevent the environmental temperature of the machine tool 2 performing finishing from changing, an operation of another edge computer having high correlativity is synchronized and changed.

Figure 6:
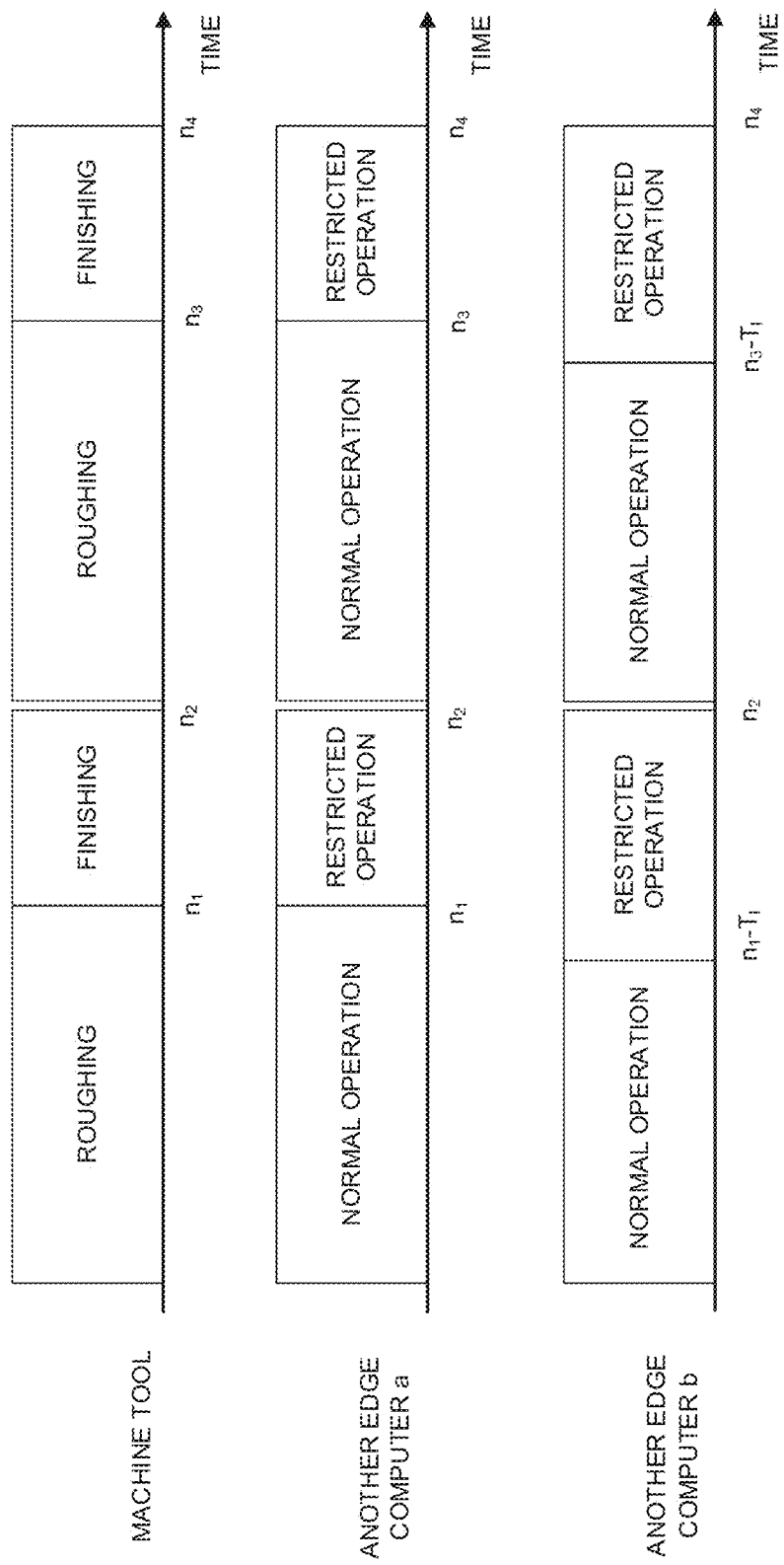
FIG. 6 is a diagram showing an exemplary operation plan made by an operation plan making unit.

The operation plan made by the operation plan making unit 120 may also determine the time zone in which a restriction is imposed on the operation of another edge computer. As shown in FIG. 6, the operation plan making unit 120 expects that the machine tool 2 will perform finishing in the time zone between $n_1$ and $n_2$, with reference to the data collected by the data collecting unit 100. In this case, the operation plan making unit 120 makes the operation plan that will not change parameters in the operation to prevent a change in heat value of another edge computer a that affects the finishing performed by the machine tool 2 in the time zone between $n_1$ and $n_2$, and causes the operation plan storing section 230 to store the operation plan. At this time, in light of a case where there is a time lag (delay of heat transmission) before the change in heat value of the edge computer affects the machine tool 2, the operation plan making unit 120 may make an operation plan in which the operation restriction starts early by a time lag $T_1$ as with another edge computer b.

Figure 7:
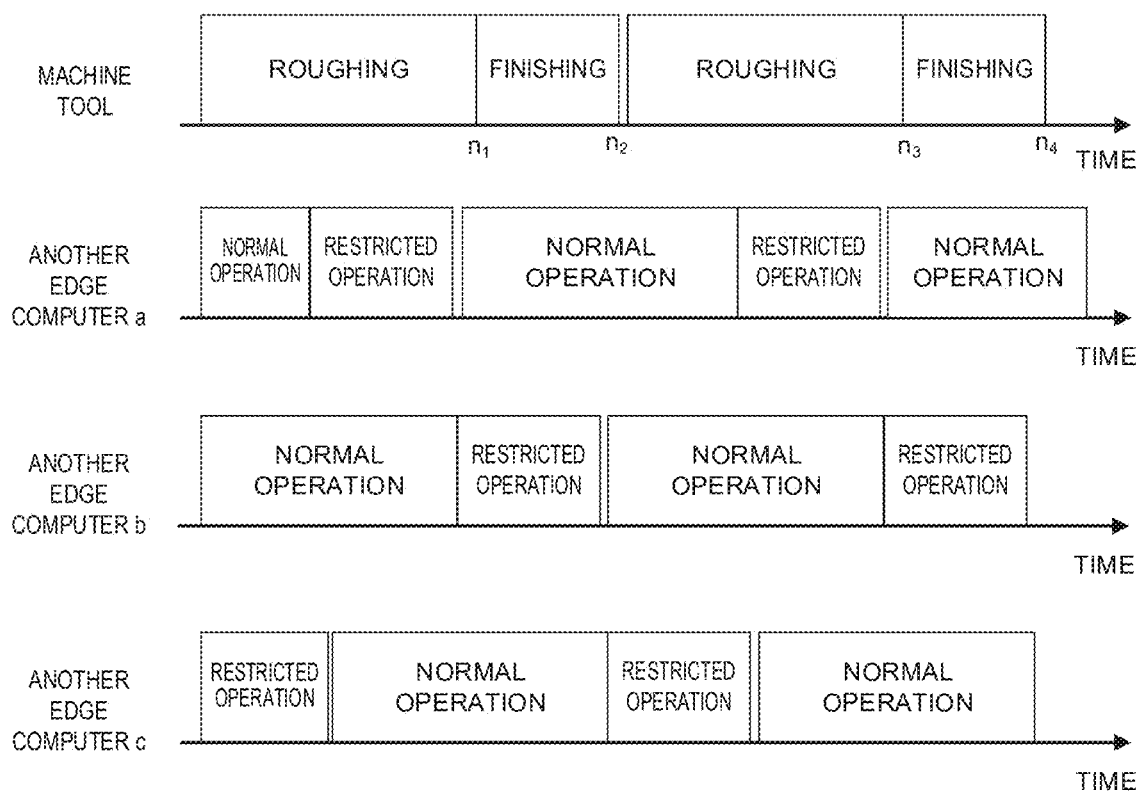
FIG. 7 is a diagram showing another example of an operation plan made by an operation plan making unit.

Further, if there is a plurality of edge computers that will affect the finishing by the machine tool 2, the operation plan making unit 120 may make, as shown in FIG. 7, an operation plan in which a time to restrict an operation of the plurality of edge computers is made different to reduce a change in environmental temperature of the machine tool 2.

The operation instruction providing unit 130 is a functional unit that provides an operation instruction to each edge computer based on the operation plan made by the operation plan making unit 120 (the operation plan stored in the operation plan storing section 230). When the operation plan is designed to impose a restriction on the operation of an edge computer, the operation instruction providing unit 130 provides an instruction for imposing the restriction on the operation of the target edge computer. When the operation plan is designed to lift a restriction from the operation of an edge computer, the operation instruction providing unit 130 provides an instruction for lifting the restriction from the operation of the target edge computer.

Figure 8:
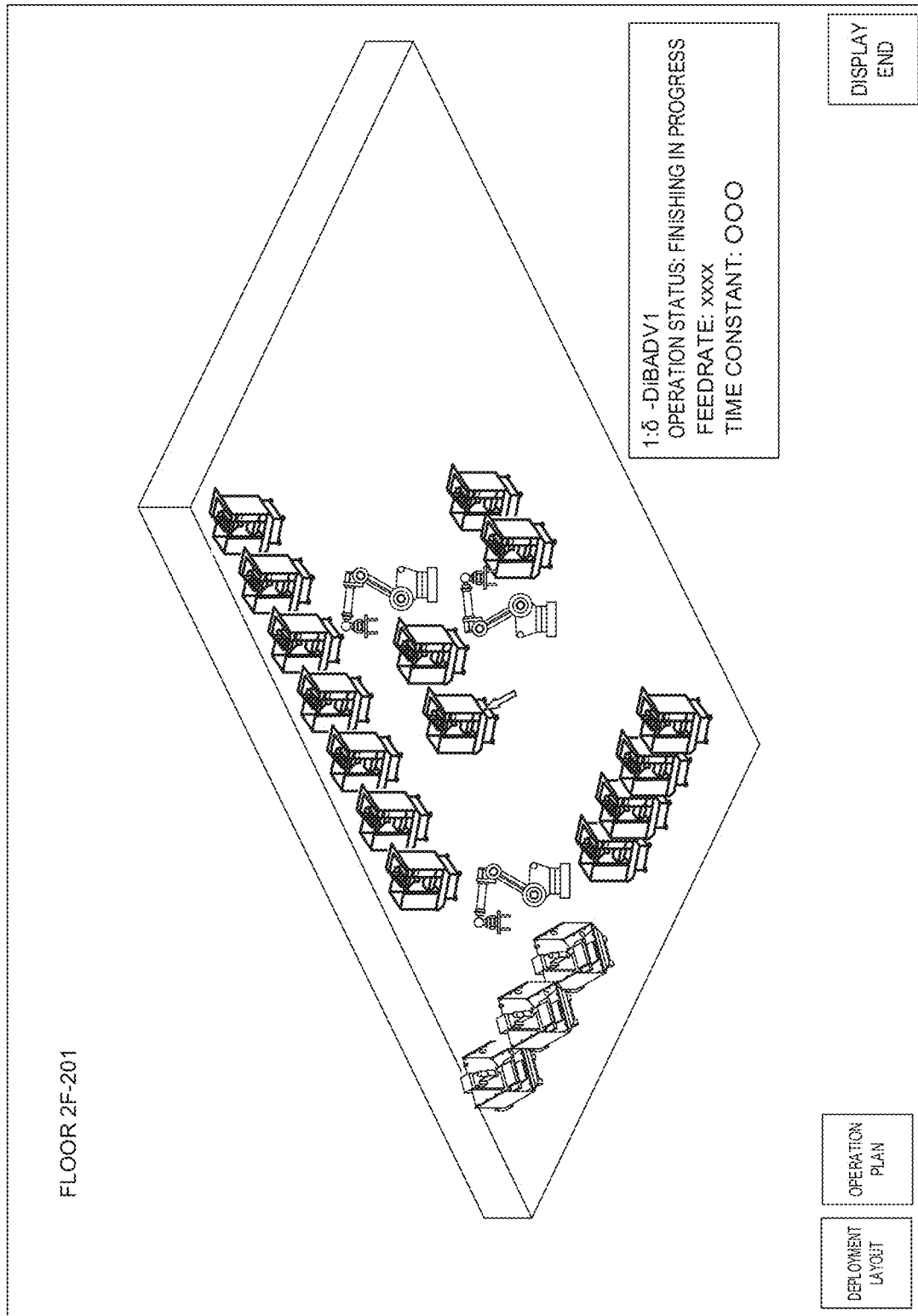
FIG. 8 is a diagram showing an exemplary screen displayed on a display device by a displaying unit.

The CPU 11 of the managing apparatus 1 shown in FIG. 2 executes the system program read out from the ROM 12, and primarily the CPU 11 executes arithmetic processing with the RAM 13 and the nonvolatile memory 14 and data output processing on the display device 70 via the interface 18, so that the displaying unit 140 is implemented. The displaying unit 140 is a functional unit that displays the management information stored in the management information storing section 200, the data collected by the data collecting unit 100 (the data stored in the obtained data storing section 210), the operation plan made by the operation plan making unit 120, and the like, on the display device 70. As shown in FIG. 8 as an example, the displaying unit 140 displays the edge computers that are under the control of the managing apparatus 1 on the display device based on the management information stored in the management information storing section 200 and the data collected by the data collecting unit 100, for example. The displaying unit 140 may display the operation status of the edge computer selected through the input device 71 on the display device 70. When a certain edge computer is selected, the displaying unit 140 may emphasize, depending on the correlativity with the selected edge computer and a heat value of the selected edge computer, another edge computer by changing the color of the other edge computer (for example, the color of the other edge computer with higher correlativity becomes a warmer color and the color of the other edge computer with higher heat value becomes a darker color) or marking. The displaying unit 140 may also display the operation plan of each edge computer shown in FIGS. 6 and 7 along the time line. The displaying unit 140 may allow an operator who is looking at the display to edit the operation plan stored in the operation plan storing section 230 with the input device 71.

The managing apparatus 1 with the above structure according to the present embodiment performs an analysis for determining the correlativity between the machine tool 2 and another edge computer among the edge computers under its control. Based on the analytical result, the managing apparatus 1 imposes a restriction on the operation of the other edge computer during the finishing performed by the machine tool 2, which enables the restriction to be imposed only on the edge computer that will affect the finishing. This enables the establishment of a machining environment that facilitates high-precision machining without significantly decreasing the overall machining efficiency in a manufacturing site.

As one variation of the managing apparatus 1 of the present embodiment, the operation plan making unit 120 may modify the operation plan for each machine tool made by the production planning device to make a production plan, for example, in which a time to perform finishing by the plurality of machine tools as edge computers is made different. A machine tool generates larger heat during roughing and generates smaller heat during finishing.

Thus, a time to perform finishing by the plurality of machine tools on the operation plan in which the production plan is modified in advance is made different, and the heat generation in the entirety of a manufacturing site is leveled in terms of time. This enables the establishment of machining environment that facilitates high-precision machining without significantly decreasing the efficiency.

Figure 9:
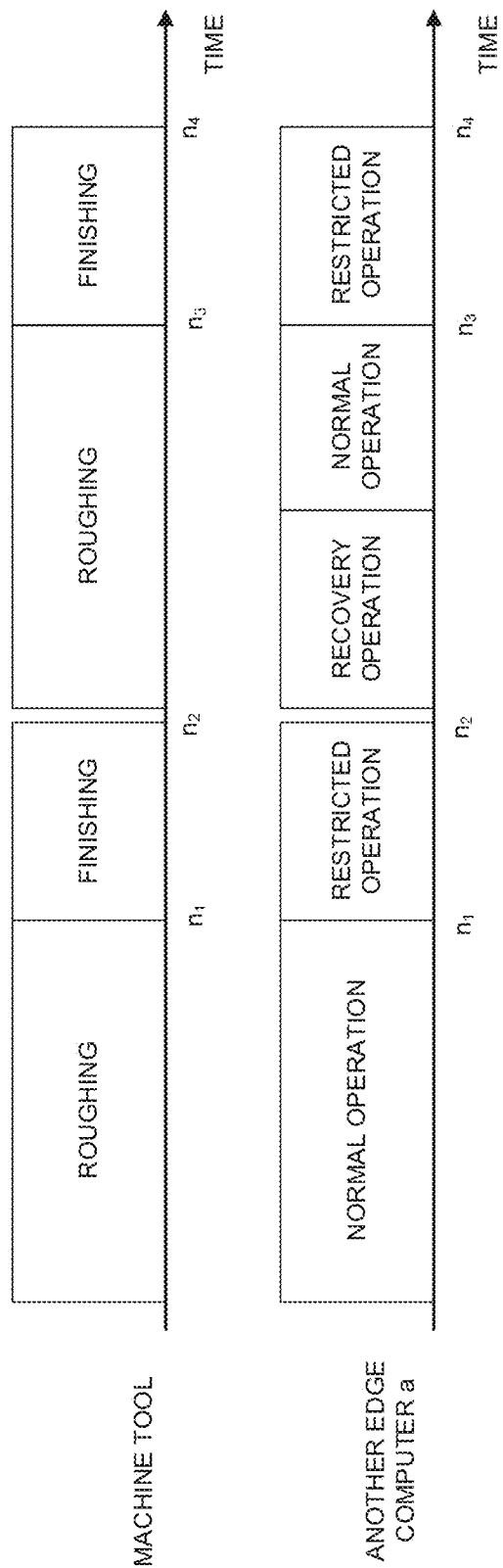
FIG. 9 is a diagram showing another example of an operation plan made by an operation plan making unit.

As another variation of the managing apparatus 1 of the present embodiment, when making an operation plan to restrict an operation at a predetermined time on the edge computer, the operation plan making unit 120 may make the following operation plan. The operation plan making unit 120 makes an operation plan so that operation parameters are set to recover a work delay due to the restriction on operation and recovery operation is performed at a time, different from the predetermined time, when the finishing of another machine tool is not affected. For example, as illustrated in FIG. 9, in another edge computer a of which an operation is restricted during the finishing of a machine tool, the work is supposed to be delayed by an amount corresponding to the restricted operation. To address this, an operation plan is so made that, after the machine tool completes the finishing, recovery operation is performed with an axis speed multiplied by a high override, which reduces a delay of the entire operation. Such a recovery operation may be performed appropriately at a predetermined time without affecting the high-precision machining such as the finishing by the other machine tool.

As another variation of the managing apparatus 1 of the present embodiment, the analyzing unit 110 may perform the analysis by known machine learning. In this case, the analyzing unit 110 builds a learning model indicating the correlativity between a plurality of operation parameters of another edge computer and the product quality of a workpiece having been machined by the machine tool 2, for example. Using this learning model, the analyzing unit 110 helps the operation plan making unit 120 to plan a restriction on the operation of the other edge computer (properly selects a parameter to be restricted for causing no effect on machining).

Yet another variation of the present embodiment may be configured as follows. A temperature sensor is set on or near each edge computer. The data collecting unit 100 gathers temperature information detected by the temperature sensor. The analyzing unit 110 uses the gathered temperature information for analysis of correlativity with operational information of another edge computer. The temperature sensor allows the analyzing unit 110 to perform an analysis for determining the correlativity between a change in operational status of the other edge computer and a change in environmental temperature of the machine tool 2. This enables the correlation analysis with higher precision. In addition, the analyzing unit 110 can determine which causes the deterioration in the product quality of a workpiece having been machined by the machine tool 2, temperature changes or other factors. Thus, the analyzing unit 110 can perform an analysis with higher precision (excluding irrelevant data) for determining the correlation between the product quality of a workpiece having been machined by the machine tool 2 and a change in the operational information on the other edge computer. Moreover, yet another structure is possible in which the temperature sensor is connected to the network 5 via another computer and the like other than an edge computer, for data collection. This enables the analysis for determining the correlativity between a change in the operational status of the other edge computer and a change in environmental temperature at the machine tool 2 without activating the machine tool 2 as an edge computer. For example, this enables the analysis excluding the change in environmental temperature caused by the operation of the machine tool 2 itself.

As yet another example, there is a case in which a plurality of edge computers are disposed at an almost equal distance from one machine tool 2, and the plurality of edge computers are of the same type and have the same specifications. In this case, for convenience, one machine tool 2 is paired with each edge computer, which makes a plurality of pairs of the machine tool 2 and one edge computer. These pairs are in similar relations with each other. In this case, the analyzing unit 110 compares the data from a pair with the data from another pair in a similar relation. When the data from a certain pair has a different tendency from the data from other pairs, the analyzing unit 110 may exclude the data having the different tendency as an outlier improper for the analysis. By doing this, the analyzing unit 110 can perform an analysis with higher precision (excluding the outlier data) for determining the correlation between the product quality of a workpiece having been machined by the machine tool 2 and the change of the operational information on another edge computer.

Figure 10:
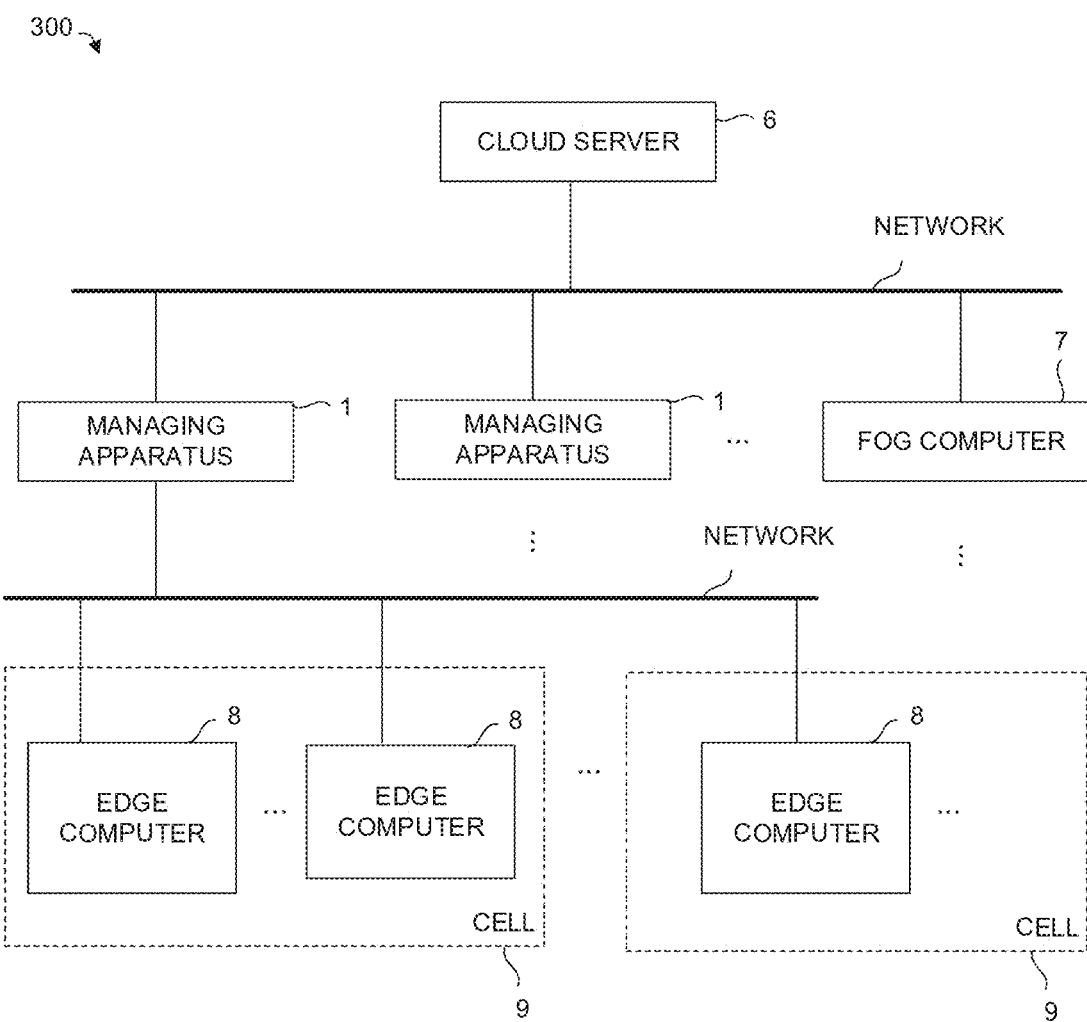
FIG. 10 is a schematic diagram showing the structure of a managing system according to a second embodiment.

FIG. 10 is a schematic diagram showing the structure of a managing system 300 with a plurality of managing apparatuses 1, according to a second embodiment. The managing system 300 shown in FIG. 10 as an example includes a plurality of managing apparatuses 1 implemented as fog computers. Each managing apparatus 1 manages a plurality of edge computers 8. The managing apparatus 1 has each function explained in the description of the first embodiment. The managing apparatus 1 is configured to exchange the data collected from the edge computers 8 under its control and the correlation information as the analytical result obtained through the analysis of the data, with another managing apparatus 1 directly or via a cloud server 6.

In the managing system 300 with this structure, the managing apparatus 1 can obtain the correlation information on the edge computers 8 having a similar layout to that of the edge computers 8 under its control from the other managing apparatus 1 and use it. Thus, at the opening of a new factory, the managing apparatus 1 for the new factory can obtain the correlation information on the edge computers 8 having a similar layout from the other managing apparatus 1, and use it for the management of the edge computers 8 in the new factory. This saves a lot of time and effort for collecting test data before the opening of the new factory.

Although some embodiments of the present disclosure have particularly been described above, the present disclosure is not limited to the above embodiments and can appropriately be modified and embodied in various ways.

The invention claimed is:

1. A managing apparatus for factory equipment, the managing apparatus being used in a manufacturing site in which a first machine tool for high-precision machining and at least one other machine are in operation, and used for managing an operation of the other machine, the managing apparatus comprising:

a processor configured to:

collect quality information on a workpiece having been machined by the first machine tool and operational information on the other machine, perform an analysis for determining correlation between the quality information on a workpiece having been machined by the first machine tool and a change in the operational information on the other machine, make an operation plan, based on the determined correlation, for imposing a restriction on an operation of the other machine to reduce a change in an environmental temperature of the first machine tool during high-precision machining performed by the first machine tool, and provide an operation instruction to the other machine based on the made operation plan.

2. The managing apparatus for factory equipment according to claim 1, wherein the other machine is a second machine tool different from the first machine tool, and the restriction is a restriction on a change in at least one of speed, acceleration, and moving frequency of an axis of the second machine tool.

3. The managing apparatus for factory equipment according to claim 2, wherein the restriction is imposed only on a specific axis of the second machine tool.

4. The managing apparatus for factory equipment according to claim 1, wherein the other machine is an air conditioner different from the first machine tool, and the restriction is a restriction on a change in temperature setting of the air conditioner.

5. The managing apparatus for factory equipment according to claim 1, wherein the processor is further configured to read a machining program for the first machine tool in advance and impose the restriction on the other machine before the first machine tool starts planed high-precision machining.

6. The managing apparatus for factory equipment according to claim 1, wherein the restriction is an adjustment to at least one of a start time and a finish time for a predetermined operation of the other machine.

7. The managing apparatus for factory equipment according to claim 1, wherein the correlation is determined by machine learning.

8. The managing apparatus for factory equipment according to claim 1, wherein the processor is further configured to:

collect temperature information generated in the first machine tool, the temperature information being detected by a temperature sensor, perform an analysis for determining correlation between the temperature information generated in the first machine tool and a change in operational information on the other machine, and make an operation plan, based on the determined correlation between the temperature information and the change in the operational information, for imposing a restriction on an operation of the other machine to reduce the change in the environmental temperature of the first machine tool during high-precision machining performed by the first machine tool.

9. A managing system, comprising:

a plurality of managing apparatuses for factory equipment, the plurality of apparatuses being connected with each other via a network, each managing apparatus of the plurality of managing apparatuses being used in a manufacturing site in which a first machine tool for high-precision machining and at least one other machine are in operation, and used for managing an operation of the other machine, the each managing apparatus comprising a processor configured to:

collect quality information on a workpiece having been machined by the first machine tool and operational information on the other machine, perform an analysis for determining correlation between the quality information on a workpiece having been machined by the first machine tool and a change in the operational information on the other machine, make an operation plan, based on the determined correlation, for imposing a restriction on an operation of the other machine to reduce a change in an environmental temperature of the first machine tool during high-precision machining performed by the first machine tool, provide an operation instruction to the other machine based on the made operation plan, and share an analytical result obtained by the processor with other managing apparatuses among the plurality of managing apparatuses.

* * * * *